(12) United States Patent
Moore

(10) Patent No.: US 7,240,455 B2
(45) Date of Patent: Jul. 10, 2007

(54) DC ANT AND INSECT REPELLER

(76) Inventor: Jerry C. Moore, 611 N. Orange St., Giddings, TX (US) 78942

(*) Notice: Subject to any disclaimer, the term of this patent is extended or adjusted under 35 U.S.C. 154(b) by 0 days.

(21) Appl. No.: 11/194,289

(22) Filed: Aug. 1, 2005

(65) Prior Publication Data

US 2007/0022652 A1 Feb. 1, 2007

(51) Int. Cl.
*A01M 1/022* (2006.01)
(52) U.S. Cl. ............................ 43/112; 43/98
(58) Field of Classification Search ............ 43/112, 43/98
See application file for complete search history.

(56) References Cited

U.S. PATENT DOCUMENTS

| 4,422,015 A * | 12/1983 | Nilssen ............... 315/209 R |
| 4,869,015 A | 9/1989 | Murakami et al. ............ 43/98 |
| 5,280,684 A | 1/1994 | Filonczuk ................. 43/120 |
| 5,557,879 A | 9/1996 | Ott ............................ 43/112 |
| 5,732,503 A * | 3/1998 | Cheng ....................... 43/112 |
| 5,979,107 A * | 11/1999 | Richardson et al. .......... 43/112 |
| 6,314,914 B1 * | 11/2001 | Betzen ...................... 119/712 |

* cited by examiner

*Primary Examiner*—Peter M. Poon
*Assistant Examiner*—John D. Holman
(74) *Attorney, Agent, or Firm*—Derek R. Van Gilder

(57) ABSTRACT

A method and an apparatus for repelling ants and other insects positions design flow of insulated DC current in design proximity to targeted areas (1), facilities, equipment and AC electrical devices occupied by or likely to be occupied by the ants and other insects. The apparatus includes a DC ant and insect repeller having an insulated electromagnet conductor wire (2) with electromagnetic windings (3) charged with predetermined flow of DC electricity. Charge of DC electricity is predetermined for causing cyclic heat of 140° F. from electrical resistance within a range of 50-to-90 ohms in the electromagnetic windings. A flow cycler (26) cycles current on-and-off to prevent the repeller from being a heater of a cold place or a heater in opposition to an air-conditioner or desirable weather temperature while also minimizing use of electricity for repelling the ants and other insects.

4 Claims, 5 Drawing Sheets

DC ANT AND INSECT REPELLER

BACKGROUND OF THE INVENTION

1. Field of the Invention

This invention relates to repelling ants and insects with direct electrical current (DC).

2. Relation to Prior Art

Invasion of ants and other insects into human environment and mechanisms has been a chronic problem of civilization. Particularly representative of this problem is swarming of ants on electrical AC switches, equipment, control panels and other AC devices to which they appear to have innate attraction. Oilfield equipment, air conditioners and electrical-control panels are particularly vulnerable and often expensively damaged as a result. Additionally, armies of ants, termites, roaches and bugs will, if not stopped, come from landscape that is desirable to them and to humans.

Preventing the invasion of ants and other insects by electrocuting them with electrical traps is known. For such electrocution, current from an input pole is directed through their bodies to an outlet pole. Not known or used previously, however, is positioning design DC current in design proximity to targeted areas occupied by or likely to be occupied by the ants and other insects for repelling them in a manner taught by this invention.

Related but different prior art is known to include the following:

| Patent Number | Inventor | Disclosure Date |
| --- | --- | --- |
| U.S. Pat. No. 4,869,015 | Murakami, et al | 9/26, 1989 |
| U.S. Pat. No. 5,280,684 | Filonczuk | 1/25, 1994 |
| U.S. Pat. No. 5,557,879 | Ott | 9/24, 1996 |
| U.S. Pat. No. 5,732,503 | Cheng | 3/31, 1998 |

SUMMARY OF THE INVENTION

Objects of patentable novelty and utility taught by this invention are to provide a method and an apparatus for repelling ants and other insects with novel merit that includes:

repelling the ants and other insects thoroughly from an area, equipment or facility in which they have entered or are likely to enter;

avoiding objectionable accumulation of dead bodies and remains of ants and insects;

avoiding liner, damage and contamination from materials of other methods of eliminating the ants and other insects; and preventing return of the ants and other insects for entire seasonal periods without causing accumulation of undesired heat, without creating open electrical current in targeted areas and without death which prevents learning of the ants and other insects not to return within time limits of their capacities to remember.

This invention accomplishes these and other objectives with a method and an apparatus for positioning flow of DC current designedly in proximity to targeted areas, facilities, equipment and AC electrical devices occupied by or likely to be occupied by ants and other insects. The apparatus includes a DC ant and insect repeller having an electromagnetic coil charged with predetermined flow of DC electricity. The electromagnetic coil is preferably insulated from undesired electrical, heat and corrosive conditions. Charge of DC electricity is predetermined for preventing heat in excess of 140° F. while causing electrical resistance within a range of 50-to-90 ohms in windings of the electromagnetic coil. The charge of DC electricity is cycled on and off as necessary to prevent accumulation of undesired heat in the targeted area without sacrificing effectiveness of the repeller. For portably versatile-use repellers, the electromagnetic coil can be a spool 2-to-6 inches long between insulating end washers that are support members. Coated conductor wire for the electromagnetic coil has a diameter within a range of 0.010-to-0.020 inches (26-to-32 gauge) with a plurality of 2,000-to-2,500 windings. Preferably, step-down current is either 240 volts AC to 24 volts DC, 480 volts AC to 24 volts DC or 110 volts AC to 24 volts DC for the portably versatile-use repellers. For designing select sizes and applications, electrical amperage, winding-wire diameter and plurality of windings can be coordinated predeterminedly for achieving the 140° F. in combination with electrical resistance within a range of 50-to-90 ohms from a range of 6-to-48 volts of DC electricity. For permanent installation in buildings, equipment, panels and AC electrical controls, the electromagnetic coils can be sized, positioned and operated cyclically for desired repellant effect while avoiding accumulation of undesired heat of the targeted area. Cycling is regulated automatically by a flow cycler to prevent heat accumulation in excess of either economical cooling capacity of normal air-conditioning or undesired heat in excess of normal weather temperature of the targeted area.

Ants and most insects do not return for periods of time within their memory capacities after having been affected by cyclic current of the ant and other insect repeller. Cyclically 140-degree heat of electrical flux of this invention teaches them not to return. Contrastingly, ants and other insects that are killed by electrocution with known electrical-charge repellers having multiple-conductors do not learn and cannot teach others of their fellow species not to return. They just keep coming to their littering deaths.

Differently from flies and most other flying insects that return almost immediately after being repelled, ants and other non-flying insects appear to have evolved capacities for learning not to return quickly after being repelled because their non-flying mobility is not sufficiently protective for rapid escape from and return to repelling conditions. Electrocuting or otherwise killing flies and other flying insects may be more effective for repelling them, while creating repelling conditions like heated DC electrical flux that is insulated as taught by this invention is more effective than electrocution or electrical shock for repelling the ants and other insects.

The ant and other insect repeller of this invention is structured and controlled to prevent its being a heater of a cold place. Although this invention can be used for providing low levels of heat for heating a cold place, its rate of cyclic on-and-off operation within the memory capacities of the ants and other insects does not raise temperature of the targeted area appreciably like a standard heater. Contrastingly, heaters provide heat appreciably in excess of temperature of a cold place. Different from this invention which is caused not to provide heater-level heat cumulatively, heaters cause heat in excess of weather temperature or cooling capacities of air-conditioning.

BRIEF DESCRIPTION OF DRAWINGS

This invention is described by appended claims in relation to description of a preferred embodiment with reference to the following drawings which are explained briefly as follows:

DESCRIPTION OF PREFERRED EMBODIMENT

Referring to the FIGS., a method has the following steps for repelling ants and other comparably affected insects:

positioning design flow of DC electricity in design proximity to at least one targeted area (1) occupied by or likely to be occupied by the ants and other comparably affected insects;

the design flow of DC electricity is through an electromagnet conductor wire (2) having a wire diameter for causing electrical-resistance heat of approximately 140° F. of the electromagnet conductor wire (2) in a plurality and size of electromagnetic windings (3) of the electromagnet conductor wire (2) on a spool with a winding circumference in combination with electrical resistance of the electromagnet conductor wire (2) for causing a range of 50-to-90 ohms of electrical resistance from DC electricity within a range of 6-to-48 volts; and cycling the design flow of DC electricity through the electromagnet conductor wire (2) periodically and selectively with a flow cycler (26) for effectiveness in repelling predetermined ants and other insects under predetermined environmental conditions without causing accumulation of undesired heat or open electrical current in the targeted area and without preventing pluralities and communities of the ants and other insects from learning not to return by killing them.

Figure 1:
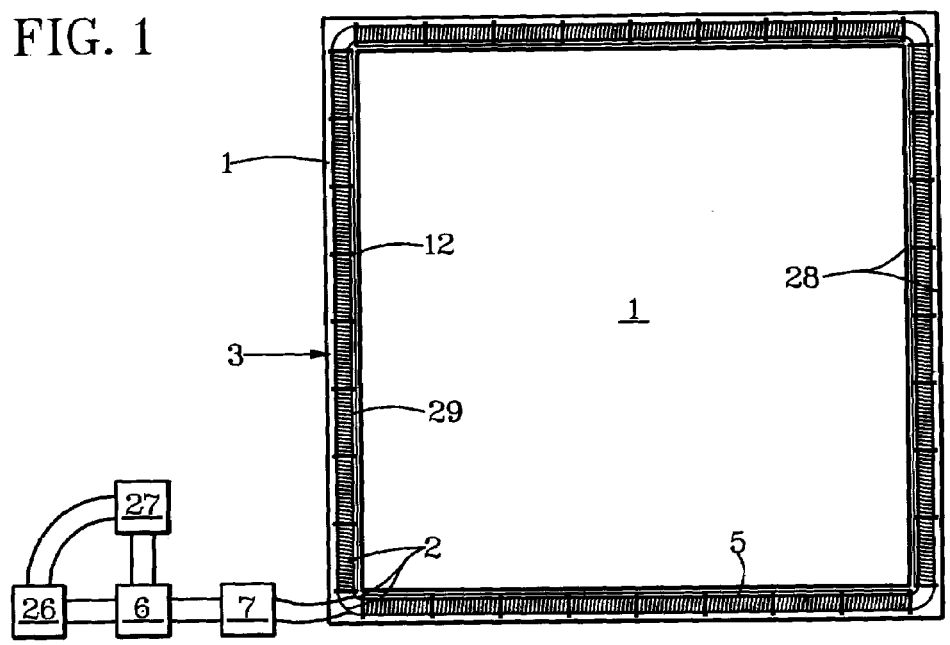
FIG. 1 is a top view of an ant and insect repeller having an area spool in a targeted area.
Figure 2:
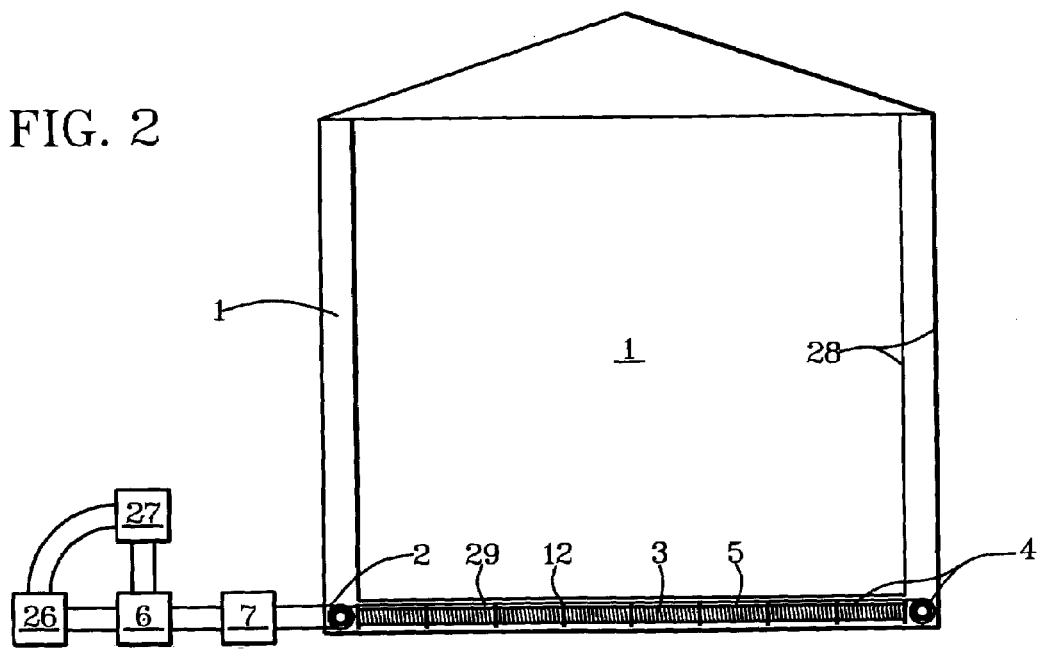
FIG. 2 is a side view of the FIG. 1 illustration.
Figure 3:
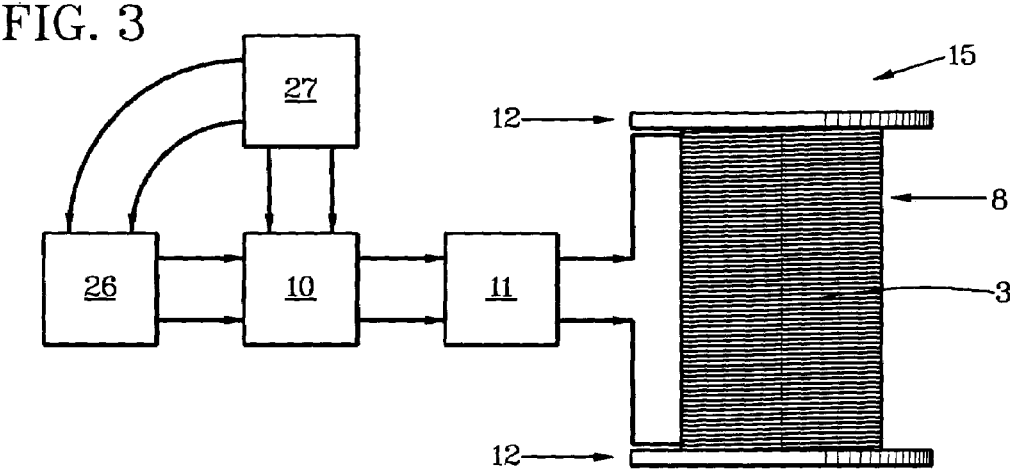
FIG. 3 is a top view of the ant and insect repeller having a portable spool and a flow cycler.
Figure 4:
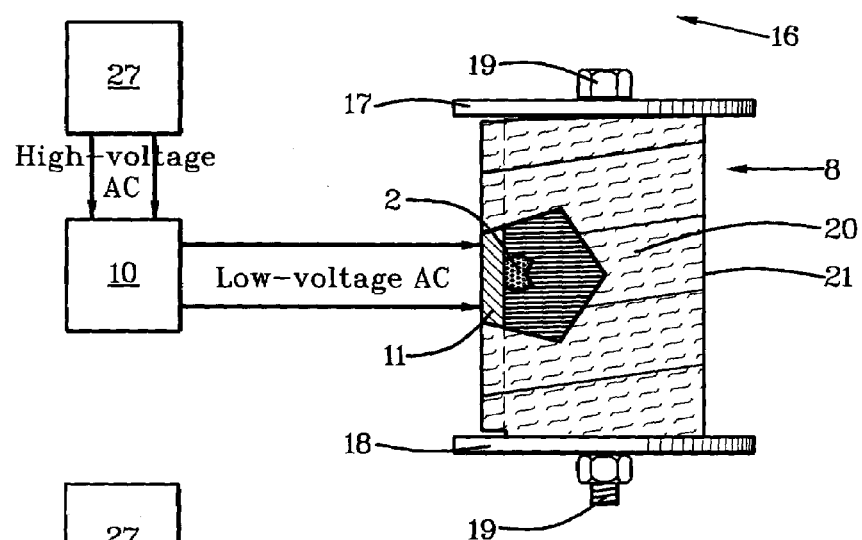
FIG. 4 is a top view of the ant and insect repeller having the portable spool and a portable rectifier covered with tape and sealant that also cover windings of electromagnetic conductor wire on the portable spool.
Figure 5:
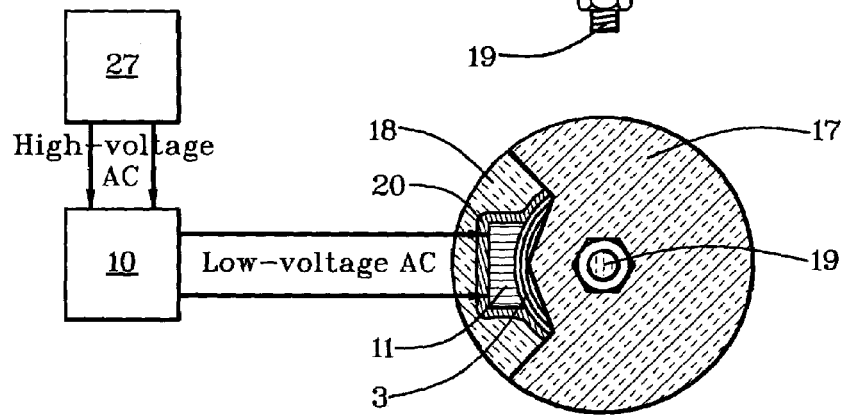
FIG. 5 is a side view of the FIG. 4 illustration.
Figure 6:
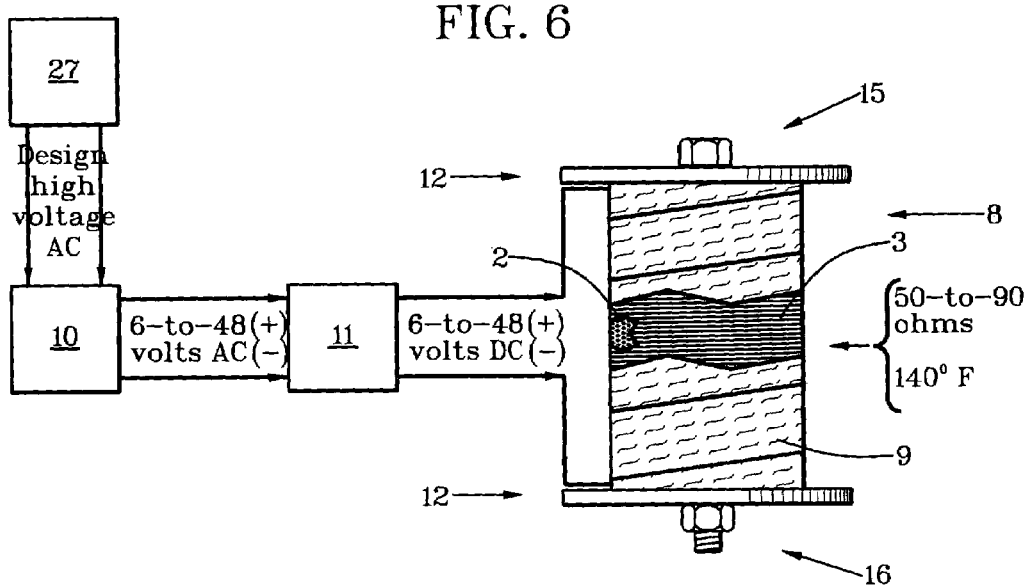
FIG. 6 is a top view of the ant and insect repeller having a portable transformer with a range of voltage of DC electricity for producing a range of 50-to-90 ohms of electrical resistance for generating heat of 140 degrees F.

As shown in FIGS. 1–2, the spool can be an area spool (4) positioned predeterminedly about the targeted area (1) and covered with protective insulation (5) predeterminedly.

Preferably, an area transformer (6) is positioned proximate the area spool (4) for transforming predeterminedly high-voltage AC electricity to predeterminedly low-voltage AC electricity. An area rectifier (7) is positioned in electrical communication between the area transformer (6) and the electromagnet conductor wire (2) for converting the predeterminedly low-voltage AC electricity from the area transformer (6) to DC electricity in electrical communication through the electromagnet conductor wire (2).

Referring to FIGS. 3–9, the spool can be a portable spool (8) positioned selectively in proximity to the targeted area (1) and covered with spool insulation predeterminedly. A portable transformer (10) can be positioned proximate the portable spool (8) for transforming the predeterminedly high-voltage AC electricity to the predeterminedly low-voltage AC electricity. A portable rectifier (11) can be positioned in electrical communication between the portable transformer (10) and the electromagnet conductor wire (2) for converting predeterminedly low-voltage AC electricity from the portable transformer (10) to DC electricity in electrical communication through the electromagnet conductor wire (2).

The portable spool (8) is wound with a predetermined plurality of the electromagnetic windings (3) of the electromagnet conductor wire (2). The portable transformer (10) is positioned proximate the portable spool (8) for transforming predeterminedly high AC voltage to predeterminedly low AC voltage. The portable rectifier (11) is positioned in electrical communication intermediate the portable transformer (10) and the electromagnet conductor wire (2) for converting the predeterminedly low AC voltage from AC to DC electricity.

The spool insulation can be positioned on the electromagnetic windings (3).

The portable spool (8) is supported in design proximity to the targeted area (1) by at least one spool support (12).

The electromagnet conductor wire (2) has a wire diameter in combination with the predetermined plurality of the electromagnetic windings (3) on the portable spool (8) for causing a range of 50-to-90 ohms of electrical resistance and electrical-resistance heat of approximately 140° F. of the electromagnet conductor wire (2) from DC electricity within a range of 6-to-48 volts designedly.

Figure 7:
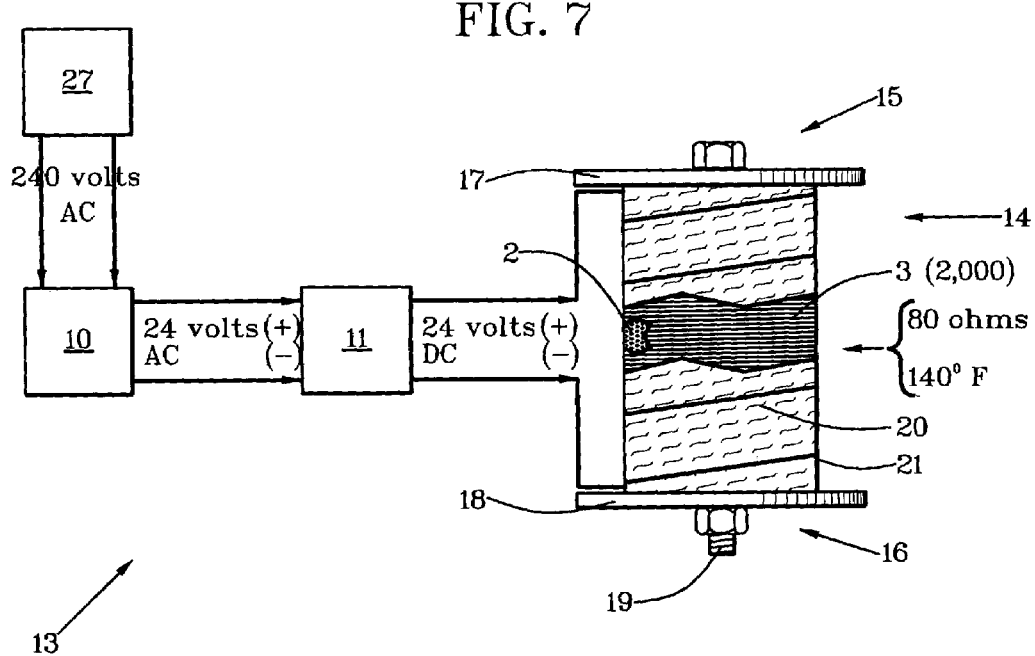
FIG. 7 is a top view of a small repeller having the portable transformer with 240 volts of AC electricity transformed to 24 volts of DC electricity for producing 80 ohms of electrical resistance and heat of 140 degrees F. in the portable spool.

As shown in FIG. 7, the DC ant and insect repeller can be a small repeller (13) having a two-inch spool (14) with a length of approximately two inches intermediate a first end (15) and a second end (16). The electromagnet conductor wire (2) has a diameter of approximately 0.009 inches. The plurality of the electromagnetic windings is 2,000 intermediate the first end (15) and the second end (16). The portable transformer (10) is structured for transforming 240 volts of AC electricity to 24 volts of AC electricity. The portable transformer (10) is in electrical communication of the 24 volts of AC electricity to the portable rectifier (11). The portable rectifier (11) is structured and positioned in electrical communication for converting the 24 volts of AC electricity to 24 volts of DC electricity in the electromagnet conductor wire (2) for causing an electrical resistance of approximately 80 ohms in and heat of approximately 140° F. of the electromagnet conductor wire (2).

As shown further in FIGS. 4–5 and 7–9, the spool support (12) can be a first insulating washer (17) proximate the first end (15) and a second insulating washer (18) proximate the second end (16).

As shown in FIGS. 4–9, the two-inch spool (14) can be an insulated bolt shaft (19) having a predetermined length intermediate the first end (15) and the second end (16).

The electromagnetic windings (3) are wrapped with predetermined insulation tape (20) and weatherproofed with a predetermined sealant (21). The sealant (21) is represented by only an edge line because it need not be sufficiently thick for showing thickness.

Figure 8:
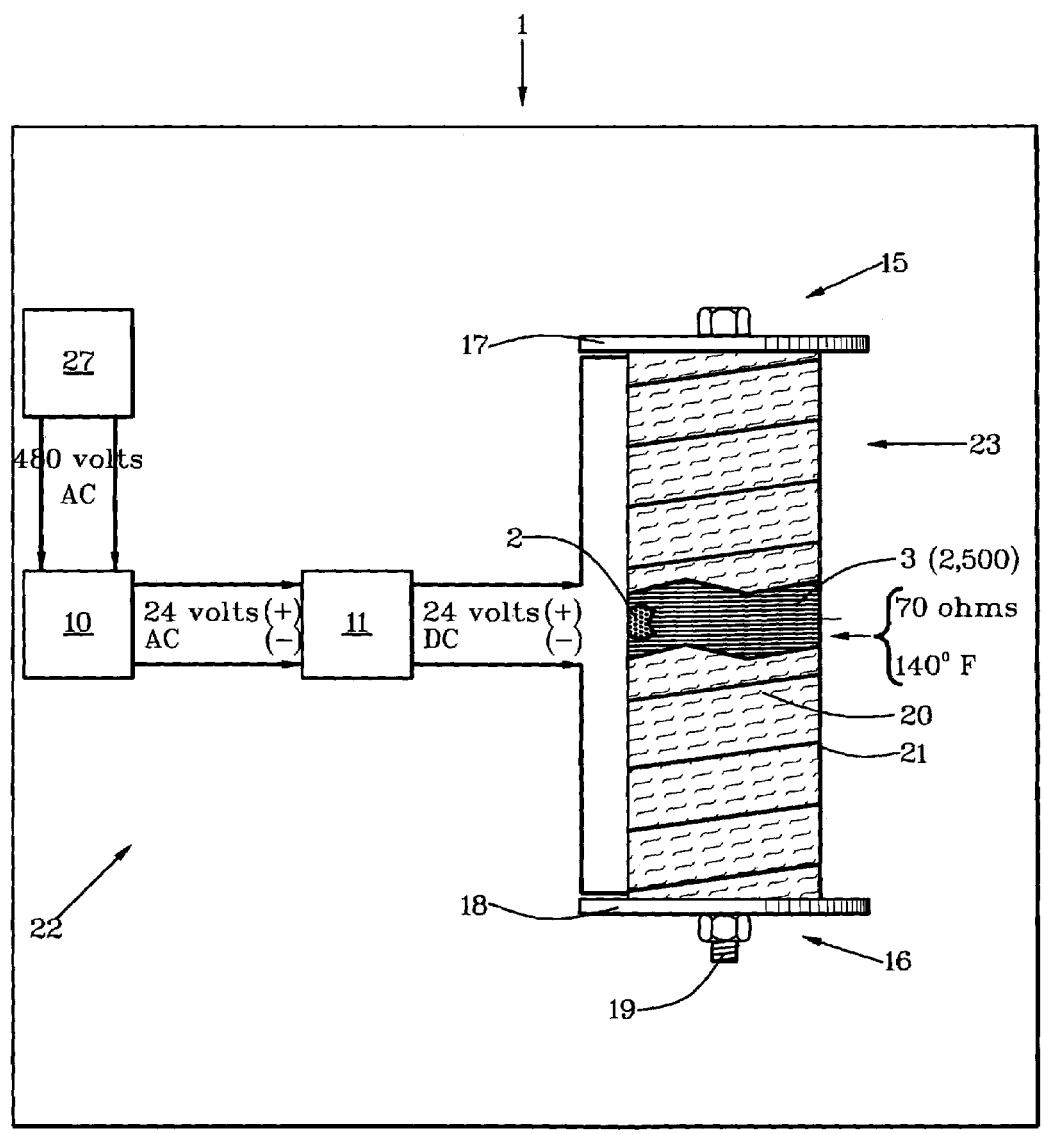
FIG. 8 is a top view of a medium repeller in a targeted area and having the portable transformer with 480 volts of AC electricity transformed to 24 volts of DC electricity for producing 70 ohms of electrical resistance and heat of 140 degrees F. in the portable spool.

As shown in FIG. 8, the DC ant and insect repeller can be a medium repeller (22) having a three-to-four-inch spool (23) with a length in a range of three-to-four inches intermediate the first end (15) and the second end (16). The electromagnet conductor wire (2) has a diameter of approximately 0.010 inches. The plurality of the electromagnetic windings (3) is 2,500 intermediate the first end (15) and the second end (16). The portable transformer (10) is structured for transforming 480 volts of AC electricity to 24 volts of AC electricity. The portable transformer (10) is in electrical communication of the 24 volts of AC electricity to the portable rectifier (11) and the portable rectifier (11) is structured and positioned in electrical communication for converting the 24 volts of AC electricity to 24 volts of DC electricity in the wire (2) for causing an electrical resistance of approximately 70 ohms in and heat of approximately 140° F. of the wire (2).

As for all of the portable spools shown in FIGS. 4–9, the spool support (12) can be the first insulating washer (17) proximate the first end (15) and a second insulating washer (18) proximate the second end (16) of the three-to-four-inch spool (23). The three-to-four-inch spool (23) can be the insulated bolt shaft (19) having a predetermined length intermediate the first end (15) and the second end (16). The electromagnetic windings (3) are preferably wrapped with the predetermined insulation tape (20) and weatherproofed with the predetermined sealant (21).

Figure 9:
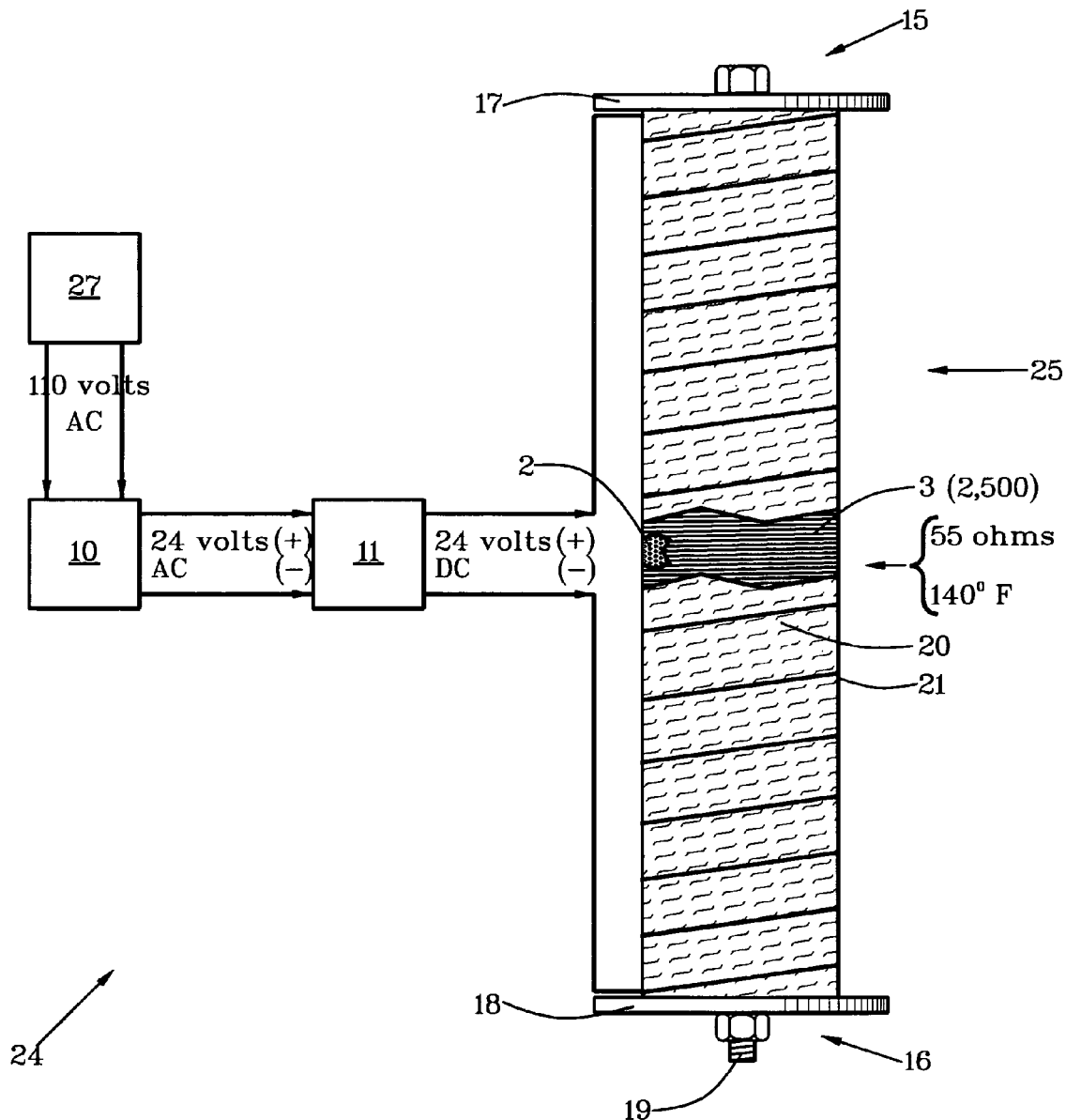
FIG. 9 is a top view of a large repeller having the portable transformer with 110 volts of AC electricity transformed to 24 volts of DC electricity for producing 55 ohms of electrical resistance and heat of 140 degrees F. in the portable spool.

As shown in FIG. 9, the DC ant and insect repeller can be a large repeller (24) having a six-to-eight-inch spool (25) with a length in a range of six-to-eight inches intermediate the first end (15) and the second end (16). The wire (2) has a diameter of approximately 0.018 inches. The plurality of the electromagnetic windings (3) is 2,500 intermediate the first end (15) and the second end (16). The portable transformer (10) is structured for transforming 110 volts of AC electricity to 24 volts of AC electricity. The portable transformer (10) is in electrical communication of the 24 volts of AC electricity to the portable rectifier (11) and the portable rectifier (11) is structured and positioned in electrical communication for converting the 24 volts of AC electricity to 24 volts of DC electricity in the electromagnet conductor wire (2) for causing an electrical resistance of approximately 55 ohms in and heat of approximately 140° F. of the electromagnet conductor wire (2).

A method can have the following steps for repelling ants and other comparably affected insects:

positioning flow of DC electricity in design proximity to at least one targeted area (1) occupied by or likely to be occupied by the ants and other comparably affected insects;

the flow of DC electricity is through electromagnet conductor wire (2) having a wire diameter for causing electrical-resistance heat of approximately 140° F. of the electromagnet conductor wire (2) in a plurality and size of electromagnetic windings (3) of the electromagnet conductor wire (2) on a spool with a winding circumference in combination with electrical resistance of the electromagnet conductor wire (2) for causing a range of 50-to-90 ohms of electrical resistance from DC electricity within a range of 6-to-48 volts; and cycling the flow of DC electricity through the electromagnet conductor wire (2) periodically and selectively with a flow cycler (26) for effectiveness in repelling predetermined ants and other insects under predetermined environmental conditions.

A new and useful DC ant and insect repeller having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. A DC ant and insect repeller comprising:

a portable spool (8) wound with a predetermined plurality of the electromagnetic windings (3) of an electromagnet conductor wire (2);

a portable transformer (10) positioned proximate the portable spool (8) for transforming predeterminedly high AC voltage to predeterminedly low AC voltage;

a portable rectifier (11) positioned in electrical communication intermediate the portable transformer (10) and the electromagnet conductor wire (2) for converting the predeterminedly low AC voltage from AC to DC electricity;

spool insulation positioned on the electromagnetic windings (3);

the portable spool (8) being supported in design proximity to a targeted area (1) by at least one spool support (12);

the DC ant and insect repeller is a small repeller (13) having a two-inch spool (14) with a length of approximately two inches intermediate a first end (15) and a second end (16);

the electromagnet conductor wire (2) has a diameter of approximately 0.009 inches;

the plurality of the electromagnetic windings (3) is 2,000 intermediate the first end (15) and the second end (16);

the portable transformer (10) is structured for transforming 240 volts of AC electricity to 24 volts of AC electricity;

the portable transformer (10) is in electrical communication of the 24 volts of AC electricity to the portable rectifier (11);

the portable rectifier (11) is structured and positioned in electrical communication for converting the 24 volts of AC electricity to 24 volts of DC electricity in the electromagnet conductor wire (2) for causing an electrical resistance of approximately 80 ohms and heat of approximately 140° F. of the electromagnet conductor wire (2) between off cycles;

a flow cycler (26) positioned in electrical communication with the portable transformer (10);

the flow cycler (26) having on-and-off flow cycling of electrical current to the DC ant and insect repeller with duration of on-timing and off-timing for causing predeterminedly on-and-off cyclic current and heat for repelling ants and other insects;

the on-timing having predeterminedly short duration for preventing accumulation of undesired heater-level heat for heating the target area (1) predeterminedly;

the off-timing duration of the flow cycler (26) being timed for repelling return of the ants and other insects predeterminedly with recycling of the on-timing; and the off-timing being timed predeterminedly for allowing dissipation of any undesired heat of the target area (1) between on-timing cycles with the flow cycler (26.

2. The DC ant and insect repeller of claim 1 wherein:

the support spool (12) has a first insulating washer (17) proximate the first end (15) and a second insulating washer (18) proximate a second end (16) of the two-inch spool (14).

3. The DC ant and insect repeller of claim 1 wherein:

the two-inch spool (14) includes an insulated bolt shaft (19) having a predetermined length intermediate the first end (15) and the second end (16).

4. The DC ant and insect repeller of claim 1 wherein:

the electromagnet windings (3) are wrapped with predetermined insulation tape (20) and weatherproofed with a predetermined sealant (21).

\* \* \* \* \*